United States Patent [19]
Joiner

[11] 3,810,713
[45] May 14, 1974

[54] HELICOPTER ROTOR SYSTEMS

[75] Inventor: Walter Charles Joiner, East Coker near Yeovil, England

[73] Assignee: Westland Aircraft Limited, Yeovil, Somerset, England

[22] Filed: Oct. 30, 1972

[21] Appl. No.: 301,714

[30] Foreign Application Priority Data
Dec. 1, 1971   Great Britain..................... 57793/71

[52] U.S. Cl.................. 416/205, 416/136, 416/206
[51] Int. Cl. ............................................ B64c 27/48
[58] Field of Search..................... 416/134, 136, 206

[56]   References Cited
UNITED STATES PATENTS
1,645,811   10/1927   Junkers............................... 416/206
2,146,367   2/1939    Berliner .............................. 416/136
3,174,553   3/1965    Spears................................. 416/206
3,237,697   3/1966    Ford et al. ....................... 416/241 X
3,254,724   6/1966    Brooke ........................... 416/136 X
3,484,174   12/1969   McCoubrey ......................... 416/132
3,545,880   12/1970   Mouille........................... 416/136 X FOREIGN PATENTS OR APPLICATIONS
1,190,259   4/1970   Great Britain...................... 416/136

Primary Examiner—Everette A. Powell, Jr.
Attorney, Agent, or Firm—Larson, Taylor & Hinds

[57]   ABSTRACT

A helicopter rotor system is disclosed in which each rotor blade is secured to a radial hub extension by mating cylindrical members, one of which carries a plurality of protrusions adapted for engagement in slots formed in the remaining members.

15 Claims, 4 Drawing Figures

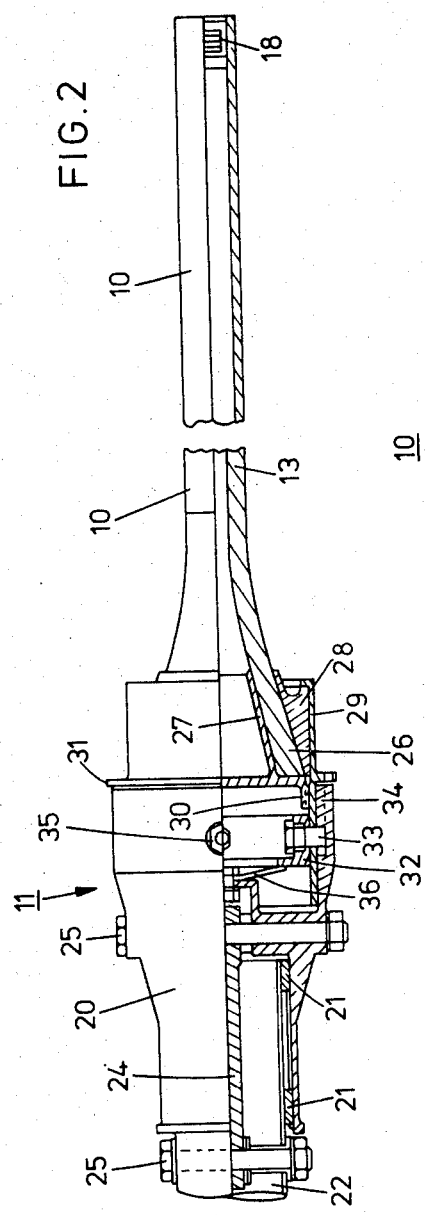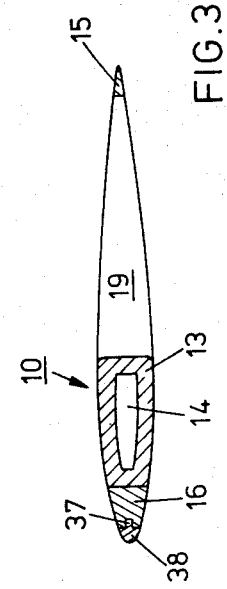

HELICOPTER ROTOR SYSTEMS

This invention relates to helicopter rotor systems.

According to the invention I provide a helicopter rotor system including a rotor hub, a plurality of rotor blades and attachment means for securing each of the rotor blades to the hub wherein the attachment means comprises two mating cylindrical members, one of the members being formed at a root end of the rotor blade and the other at the outboard end of a radial hub extension, and at least two radially extending protrusions located on one of the members and adapted to engage with an equal number of slots formed in the second member.

The invention will now be described by way of example only and with reference to the accompanying drawings, in which:

FIG. 2 is a part sectional elevation taken on lines A—A of FIG. 1,

FIG. 3 is a sectioned view taken on lines B—B of FIG. 1, and

Figure 1:
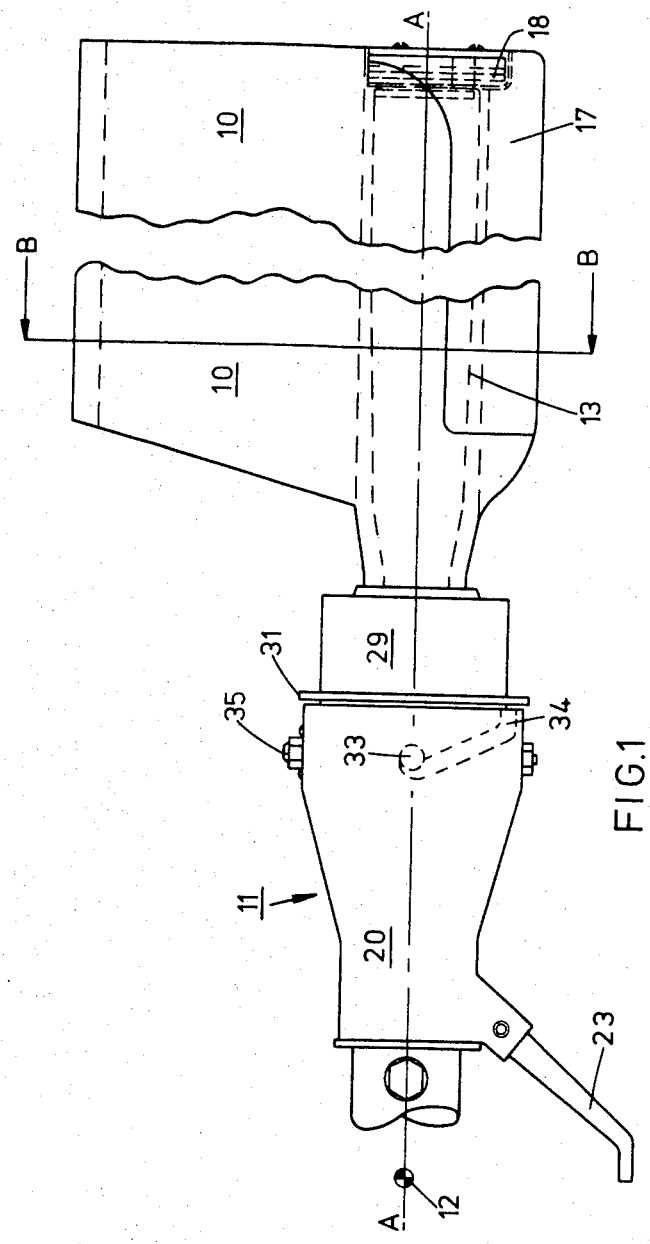
FIG. 1 is a plan view of a rotor system according to one embodiment.

Referring now to FIG. 1, a rotor blade 10 is shown connected at its inboard or root end to an attachment means (generally indicated at 11) extending radially outwardly from a rotor hub (not shown) arranged for rotation in a generally horizontal plane about an axis 12.

The rotor blade 10 is constructed of glass fibre reinforced plastic materials. Referring now to FIG. 3, the blade 10 includes a main spar box 13 wrapped around a foam core 14. The spar box 13 is of constant chord dimension throughout the length of the blade (FIG. 1), the wall thickness tapering from root to tip as shown in FIG. 2.

The blade aft of the spar is composed of foam 19 and is completed by a wedge 15 forming the trailing edge of the blade. A glass fibre balance weight 16 is bonded on the forward surface of the box 13, the leading edge being completed by a preformed leading edge nose cap 38. The nose section of the rotor blade is covered by a glass cloth skin and the entire blade section is enclosed in the cross-ply skin to provide the necessary torsional stiffness. Erosion protection is afforded by a polyurethane strip 17 which extends to 23 per cent of the chord throughout the entire length of the blade. Radial balancing is facilitated by balance weights 18 located at the tip of the blade, and fine balance adjustments are possible during manufacture by varying the depth of a slot 37 in the balance weight 16. The rotor blade is of a constant chord section and is constructed with 8° of linear twist from the centre of rotation.

In a particular embodiment of the invention the spar box 13 is composed of approximately 40 percent of 45° cross-ply and 60 percent unidirectional material, although these proportions may require some adjustment to obtain the stiffness/weight ratio required for satisfactory dynamic behaviour. The foam core 14 has a density of 16 kg. per cubic metre and the foam 19 aft of the spar box 13 has a density of 48 kg. per cubic metre. The walls of the spar box 13 taper from 7.6 m.m. thick at the root to 3 m.m. thick at the tip. The nose section covering is 25 m.m. thick and the outer cross-ply covering is 38 m.m. thick.

The rotor blade attachment means of the present invention comprise mating cylindrical members, one of the members being formed at the root end of the rotor blade and the other at the outboard end of a radial hub extension.

In the embodiment shown in FIGS. 1 and 2 the attachment means 11 includes a housing 20 having a bore at each end, the inboard end being mounted for rotation about bearings 21 mounted on an arm 22 extending radially outwardly from a rotor hub (not shown). Rotation of the housing 20 is effective to change the pitch of the rotor blade and is controlled by a pitch control arm 23 (FIG. 1) connected to the helicopter controls (not shown). Centrifugal loads between the arm 22 and the housing 20 are taken by a tie bar 24, secured at the ends by bolts 25.

The bore at the opposite end of the housing 20 provides the attachment for the rotor blade 10.

A root end 26 of the spar box 13 is thickened locally and formed into a conical shape which is bonded around an aluminum alloy mandrel 27. The root end 26 is secured by a split collet 28 retained by a sleeve 29 screwed onto a threaded flange 30 formed on the mandrel 27. A flange 31 on the outer diameter of the sleeve 29 is provided with slots for engagement by a spanner.

A collar 32 is located in the bore of the sleeve 29 by two pins 33 arranged at 180° spacing. Each pin is screwed into the collar and has a shank portion which extends radially outwardly through holes to protrude from the outer cylindrical surface of the sleeve 29. The protruding shank portions are adapted to engage in two slots 34 formed in the inner surface of the bore in the housing 20 and arranged so that the blade is rotated through approximately 70° during movement of the pins 33 through the length of the slots 34 between its free and fixed positions. The blade is locked in its fitted operational position as shown in the drawings by a bolt 35 inserted through the housing 20 and the sleeve 29, the bolt 35 being preferably of the self-locking type. In the fitted position an inner surface of the collar serves to compress a spring washer 36 bolted centrally in the housing 20. Notches can be provided at the closed ends of the slots 34 to positively locate the pins 33 with the rotor blade 10 in its fitted position.

Centrifugal loads are transferred to the hub (not shown) via the pins 33 and the locking bolt 35 in shear, while torsional loads are taken by the bolt 35. Bending moments are reacted by the length of the sleeve 29 located in the bore of the housing 20. The spring washer 36 exerts a constant pressure on the collar 32 in a spanwise direction to prevent spanwise vibration.

Figure 4:
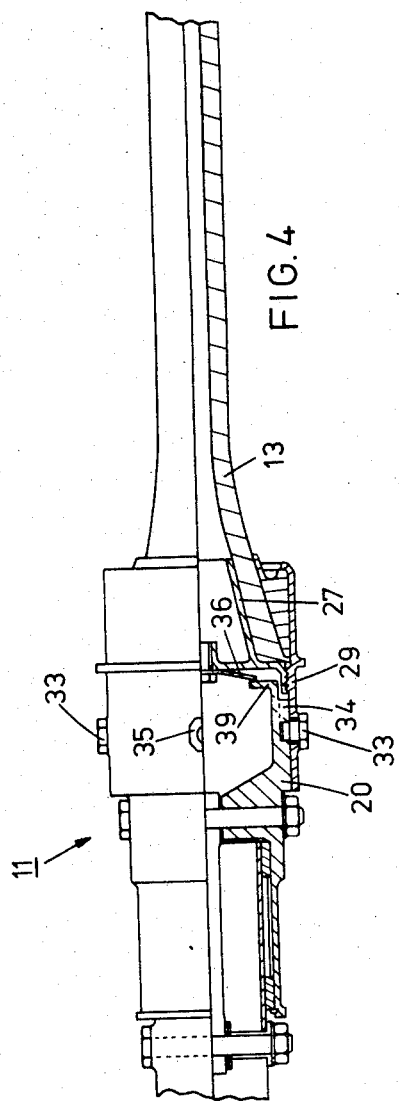
FIG. 4 is a part sectional elevation similar to FIG. 2 showing a second embodiment of the invention.

The embodiment of the invention shown in FIG. 4 is similar to that previously described except that the mating cylindrical members are reversed so that the bore of the sleeve 29 mates with the external surface of the housing 20. Like reference numerals are used to designate similar parts in the following description.

In this embodiment the pins 33 are threaded into the wall of the sleeve 29 and the plain shank portions extend radially inwardly to engage slots 34 formed in the external cylindrical surface of the housing 20. The spring washer 36 is bolted centrally of the mandrel 27 to react against a flange 39 formed at the outboard end of the housing 20.

The arrangement of FIG. 4 enables a reduction in the diameter of the attachment means 11 to be achieved without sacrificing the necessary strength characteristics. A reduction in weight also results, especially as the collar 32 is not fitted in this embodiment.

The present invention provides a rotor blade incorporating a bayonet type attachment means which is positive, provides for quick and simple removal and replacement and which requires the minimum maintenance especially if the bearings 21 are of a type requiring no lubrication. Once the pins 33 are located in the slots 34, the blade 10 is rotated into its fitted position against the force exerted by the spring 36 by a spanner located in the flange 31, and is locked in this position by a single bolt 35.

The attachment means hereinbefore disclosed is suitable for use with any known type of rotor system, and also with rotor systems having any desired number of rotor blades.

It will be appreciated by those skilled in the art that modifications can be made without departing from the scope of the appended claims. For instance, in the particular embodiments hereinbefore described in relation to FIGS. 2 and 4, the location of the protrusions and the slots could be reversed.

I claim as my invention:

1. A helicopter rotor system including a rotor hub, a plurality of rotor blades and attachment means for securing each of the rotor blades to the hub, wherein the attachment means comprises two mating cylindrical members, one of the members being formed at the root end of the blade and the other at the outboard end of a radial hub extension, and at least two radially extending protrusions located on one of the members and adapted to engage with an equal number of slots formed in the second member, each slot having an open end to facilitate entry of the protrusions and being shaped so that rotation of the rotor blade about its longitudinal axis causes movement of the protrusions through the length of the slots to automatically guide the rotor blade between free and fitted positions.

2. A rotor system as claimed in claim 1 wherein each slot has a generally axially open end to permit generally axial entry of said protrusions as one of said mating members moves axially into the other, each slot having a further portion inclined so as to act on its associated protrusion and automatically guide said one of said members further into the other upon rotation of said rotor blade in a given direction.

3. A rotor system as claimed in claim 1, wherein the rotor blade is rotated about its longitudinal axis through approximately 70° during movement of the protrusions through the length of the slots.

4. A rotor system as claimed in claim 1 wherein the member at the root end of the blade is an external cylindrical surface of a hollow sleeve and the member at the outboard end of the radial hub extension is a bore in a housing.

5. A rotor system as claimed in claim 4, wherein the protrusions extend radially outwardly from the cylindrical surface and the slots are formed in the surface of the bore in the housing.

6. A rotor system as claimed in claim 5, wherein the protrusions are formed by plain shank portions of two diametrically opposed pins extending through holes in the wall of the hollow sleeve, the pins being threaded into a collar located in the bore of the hollow sleeve.

7. A rotor system as claimed in claim 1, wherein the member at the root end of the blade is a bore in a hollow sleeve and the member at the outboard end of the radial hub extension is an external cylindrical surface of a housing.

8. A rotor system as claimed in claim 7, wherein the protrusions extend radially inwardly from the bore in the sleeve and the slots are formed in the external cylindrical surface of the housing.

9. A rotor system as claimed in claim 8, wherein the protrusions are formed by plain shank portions of two diametrically opposed pins threaded through the wall of the sleeve.

10. A rotor system as claimed in claim 1, wherein a notch is provided at the closed ends of each of the slots to positively locate the protrusions when the rotor blade is in its fitted position.

11. A rotor system as claimed in claim 1, wherein resilient means are provided and adapted to apply a force tending to axially separate the mated members.

12. A rotor system as claimed in claim 11, wherein the resilient means is a spring washer.

13. A rotor system as claimed in claim 1, wherein locking means are provided to lock the rotor blade in its fitted position.

14. A rotor system as claimed in claim 13, wherein the locking means comprises a bolt fitted through the mated cylindrical members.

15. A rotor system as claimed in claim 1, wherein a flange adapted for engagement by a spanner is provided on the mating member at the root end of the rotor blade.

* * * * *